United States Patent
Leung et al.

(10) Patent No.: US 6,262,980 B1
(45) Date of Patent: Jul. 17, 2001

(54) DYNAMIC RESOURCE ALLOCATION METHOD AND APPARATUS FOR BROADBAND SERVICES IN A WIRELESS COMMUNICATIONS SYSTEM

(75) Inventors: Kin K. Leung, Edison; Arty Srivastava, Middletown, both of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 08/982,510

(22) Filed: Dec. 2, 1997

(51) Int. Cl.$^7$ .............................. H04J 3/00; H04B 7/212
(52) U.S. Cl. .............................. 370/336; 370/337
(58) Field of Search ................................ 370/252, 336, 370/337, 347, 329, 436, 350; 455/63; 375/296, 135

(56) References Cited

U.S. PATENT DOCUMENTS

| | | |
|---|---|---|
| 4,144,411 | 3/1979 | Frenkiel . |
| 5,038,399 | 8/1991 | Bruckert . |
| 5,818,832 * | 10/1998 | McCallister ..................... 370/350 |
| 5,949,769 * | 9/1999 | Davidson et al. ................ 370/329 |
| 6,018,528 * | 1/2000 | Gitlin et al. ..................... 370/436 |

OTHER PUBLICATIONS

U.S. Patent Application Ser. No. 08/775,466, filed Dec. 30, 1996.
U.S. Patent Application Ser. No. 08/832,546, filed Apr. 3, 1997.
Samuel W. Halpern, "Reuse Partitioning in Cellular Systems," 33rd IEEE Vehicular Technology Congerence pp 322–327 (1983).

* cited by examiner

Primary Examiner—Chi H. Pham
Assistant Examiner—Brenda H. Pham (57) ABSTRACT

A dynamic resource allocation method and apparatus for broadband services in a wireless communications system. The communications system can have a number of cells, each of which has multiple sectors. Each sector can contain a number of communications sites. Information is transmitted in time subframes scheduled to avoid interference between the sectors and cells, and different degrees of concurrent packet transmission can be scheduled for different classes of communications sites. The communications sites can be classified based on reception quality, such as by comparing their measured signal-to-interference ratio (SIR) with a SIR threshold.

36 Claims, 10 Drawing Sheets

*FIG. 1*

PRIOR ART

DYNAMIC RESOURCE ALLOCATION METHOD AND APPARATUS FOR BROADBAND SERVICES IN A WIRELESS COMMUNICATIONS SYSTEM

CROSS REFERENCE TO RELATED APPLICATIONS

The subject matter of the present application is related to the subject matter of U.S. patent application Ser. No. 08/775,466 entitled "Method and Apparatus for Providing High Speed Services Using a Wireless Communications System" to Thomas K. Fong, Paul Shala Henry, Kin K. Leung, Xiaoxin Qiu, Nemmara K. Shankaranarayanan and assigned to AT&T Corp., filed on Dec. 30, 1996 and U.S. patent application Ser. No. 08/832,546 entitled "Method and Apparatus for Resource Assignment in a Wireless Communications System" to Xiaoxin Qiu Kapil Chawla, filed Apr. 3, 1997, the entire disclosures of which are hereby incorporated by reference.

FIELD OF THE INVENTION

The invention relates to wireless communications systems. More particularly, the invention relates to a method and apparatus for dynamic resource allocation for broadband services in a wireless communications system.

BACKGROUND OF THE INVENTION

The need for high-speed broadband packet services will grow tremendously as telecommuting and Internet access become increasingly popular. Customers will expect high quality, reliable access to high-speed communications from homes and small businesses in order to, for example, access: (a) the World Wide Web for information and entertainment; (b) office equipment and data from home at rates comparable to Local Area Networks (LANs); and (c) multimedia services such as voice, image and video. Although varying with application, effective broadband communication requires a bandwidth sufficient to permit a data rate up to the range of several tens of Mega-bits per second (Mbps).

Traditional wireless communications systems have a problem delivering high-speed services because of the amount of bandwidth these services require. Bandwidth is a key limiting factor in determining the amount of information a system can transmit to a user at any one time. In terms of wireless networks, bandwidth refers to the difference between the two limiting frequencies of a band expressed in Hertz (Hz).

The concept of bandwidth may be better understood using an analogy. If information carried by a network were water, and links between communication sites were pipes, the amount of water (i.e., information) a network could transmit from one site to another site would be limited by the speed of the water and the diameter of the pipes carrying the water. The larger the diameter of the pipe, the more water (i.e., information) can be transmitted from one site to another in a given time interval. Likewise, the more bandwidth a communications system has available to it, the more information it can carry.

Traditional wired communications systems using modems and a physical transmission medium, such as twisted pair copper wire, cannot currently achieve the data rates necessary to deliver high-speed service due to bandwidth limitations (i.e., small pipes). Promising wired-network technologies for broadband access, such as Asymmetrical Digital Subscriber Loop (ADSL) and Hybrid Fiber-Coax (HFC), can be expensive and time consuming to install.

The benefit of wireless systems for delivering high-speed services is that they can be deployed rapidly without installation of local wired distribution networks. However, traditional wireless systems such as narrowband cellular and Personal Communications Services (PCS) are bandwidth limited. As an alternative, wireless solutions such as Multichannel Multipoint Distribution Service (MMDS) and Local Multichannel Distribution Service (LMDS) have become attractive, but these solutions presently offer limited uplink channel capacity and may not be capable of supporting a large number of users.

Figure 1:
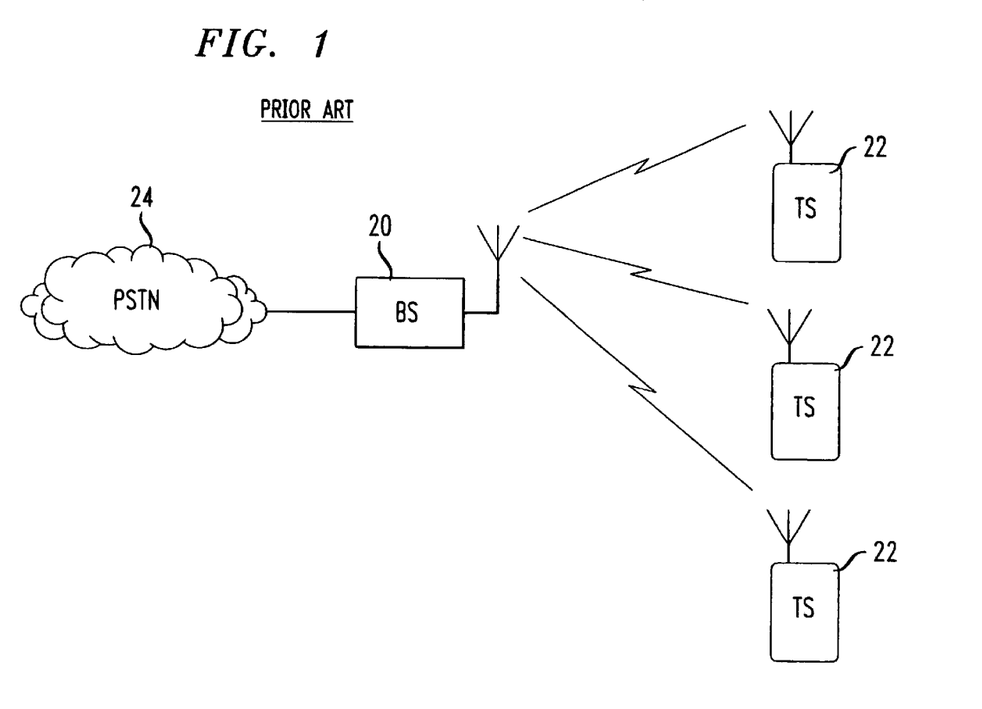
FIG. 1 is a block diagram of a typical wireless communication system suitable for an embodiment of the present invention.

One solution for solving the bandwidth limitation problem for wireless systems is to maximize the available bandwidth through frequency reuse. Frequency reuse refers to reusing a common frequency band in different cells within the system. Refer, for example, to FIG. 1 which shows a typical wireless communication system. A Base Station (BS) 20 communicate with several Terminal Stations (TS) 22. The BS 20 is usually connected to a fixed network 24, such as the Public Switched Telephone Network (PSTN) or the Internet. The BS 20 could also be connected to other base stations, or a Mobile Telephone Switching Office (MTSO) in the case of a mobile system. Each TS 22 can be either fixed or mobile.

The BS 20 communicates information to each TS 22 using radio signals transmitted over a range of carrier frequencies. Frequencies represent a finite natural resource, and are in extremely high demand. Moreover, frequencies are heavily regulated by both Federal and State governments. Consequently, each cellular system has access to a very limited number of frequencies. Accordingly, wireless systems attempt to reuse frequencies in as many geographic areas as possible.

To accomplish this, a cellular system uses a frequency reuse pattern. A major factor designing a frequency reuse pattern is the attempt to maximize system capacity while maintaining an acceptable Signal-to-Interference Ratio (SIR). SIR refers to the ratio of the level of the received desired signal to the level of the received undesired signal. Co-channel interference is interference due to the common use of the same frequency band by two different cells.

To determine frequency reuse, a cellular system takes the total frequency spectrum allotted to the system and divides it into a set of smaller frequency bands. A cellular communications system has a number of communications sites located throughout a geographic coverage area serviced by the system. The geographic area is organized into cells and/or sectors, with each cell typically containing a plurality of communications, sites such is a base station and terminal stations. A cell can be any number of shapes, such as a hexagon. Groups of cells can be formed, with each cell in the group using a different frequency band. The groups are repeated to cover the entire service area. Thus, in essence, the frequency reuse pattern represents the geographic distance between cells using the same frequency bands. The goal of a frequency reuse pattern is to keep co-channel interference below a given threshold and ensure successful signal reception.

The most aggressive frequency reuse pattern is where the same frequency band is use in every cell. One example of such a system is Code Division Multiple Access (CDMA) systems, which spread the transmitted signal across a wide frequency band using a code. The same code is used to recover the transmitted signal by the CDMA receiver. Although CDMA systems reuse the same frequencies from cell to cell, they require a large amount of frequency spectrum. In fact, the amount of spectrum required by CDMA systems to offer high-speed broadband services to a large number of users is commercially unrealistic.

Another example for aggressive frequency reuse Time Division Multiple Access (TDMA) systems, an example of which is discussed in U.S. Pat. No. 5,355,367, which use the redundant transmission of information packets to ensure an adequate SIR. The of redundant packet transmissions, however, merely trades one inefficiency for another. Although a frequency band can be reused from cell to cell, redundant packet transmission means that a smaller portion of that frequency band is now available for use by each cell in the system since multiple packets are required to ensure the successful reception of a single packet.

In addition to the frequency reuse problem, traditional cellular systems, are not engineered to allow a communications site to use the entire bandwidth available to the system (or "total system bandwidth"). Rather, traditional cellular systems employ various techniques in both frequency domain and time domain to maximize the number of users capable of being serviced by the system. These techniques are predicated on allocating smaller portions of the total system bandwidth to service individual communication sites. These smaller portions are incapable of providing sufficient bandwidth to offer high speed services.

An example of a technique employed in the frequency domain is Frequency Division Multiple Access (FDMA). FDMA splits the available bandwidth into smaller sections of bandwidth under the concept of providing less bandwidth for a greater number of users. Using the water/pipe analogy, a single large pipe is separated into a number of smaller pipes, each of which is assigned to a sector or cell. Unfortunately, the smaller frequency bands are too small to support high-speed broadband packet services. Moreover, by definition, a communication site is not capable of using the total system bandwidth, but rather is limited to a discrete portion of the total system bandwidth.

An example of a technique employed in the time domain is TDMA, described above. Using the water/pipe analogy, each cell or sector has access to the entire pipe for a fixed amount of time. These systems allocate a specific time slot of a fixed duration for a specific communication site. As a result, a communication site cannot transmit more information than can be accommodated by its assigned time slot. Traditional TDMA systems are designed to handle circuit switching and, therefore, are static in nature. Thus, traditional TDMA systems are not designed to take advantage of new switching technology, such as packet switching.

Some systems employ a combination of FDMA and TDMA to improve the call capacity of the system. These FDMA/TDMA systems, however, merely combine the disadvantages of both and do not permit a user access to the total system bandwidth on a dynamic basis. To solve this problem, some systems employ a concept called "dynamic resource allocation" to share the radio resource among communications sites efficiently. Dynamic resource allocation methods, however, require a central controller or complicated algorithms to dynamically determine available time slots and coordinate their use by the communication sites.

In order to increase spectrum efficiency, other cellular systems have employed multiple frequency reuse patterns within the same system. For example, U.S. Pat. No. 4,144, 411 issued to Frenkiel on Mar. 13, 1979, teaches static reuse of frequencies in a system employing a miniature-sized overlay in each cell, with the miniature-sized overlay using the same type of reuse pattern as the large cell reuse pattern. This is achieved through yet lower transmit powers and maintaining the same site spacing to cell radius as the large-cell. This concept is typically referred to as cell splitting.

An enhancement to Frenkiel is discussed in an article authored by Samuel W. Halpern entitled Reuse Partitioning in Cellular Systems, presented at the 33rd IEEE Vehicular Technology Conference on May 25–27, 1983 in Toronto, Ontario, Canada. The, Halpern article sets forth a cellular system having multiple frequency reuse levels (or patterns) within a given geographical area. For example, a cluster of cells normally employing a seven-cell reuse pattern may simultaneously operate on a three-cell reuse pattern and a nine-cell reuse pattern. One set of frequencies is dedicated to the three-cell reuse pattern while another set of frequencies is dedicated to the nine-cell reuse pattern. Generally, the principle behind the Halpern system is to allow a degradation of Carrier-to-Interference (C/I) performance for those subscriber units that already have more than adequate C/I protection while providing greater C/I protection to those subscribers that require it. Therefore, a subscriber with the best received signal quality will be assigned to the set of channels for the three-cell reuse pattern since they are able to tolerate more co-channel interference than a subscriber whose signal quality is poorer. The subscriber having the poorer received signal quality is therefore assigned to a channel correspondent to the nine-cell reuse pattern.

The Halpern system, like previous multiple frequency reuse partitioning systems, is unsatisfactory for a number of reasons. For example, in practice the Halpern system permits only a small fraction of the total traffic to use the closer reuse pattern for the miniature-sized overlay, leading to little or no gain in system capacity. Further, the Halpern s system is designed for circuit switched systems, and not for the modern packet switched systems. More specifically, circuit switched systems can tolerate a lot of measurement overhead and delaying when connecting to the user. If the same techniques were applied to a packet switched system, however, several measurements would be required before transmitting each packet. The overhead and delay introduced would be excessive, and therefore the method described in the Halpern reference would not be feasible. In fact, the Halpern method is designed for the conversational telephony system, and not packet switched systems in general.

Moreover, previous systems were designed to do the reuse partitioning in the frequency domain, that is they were focused on dividing the total frequency bandwidth available to the system and allocating one portion of this total frequency bandwidth to one reuse pattern, and another portion to another reuse pattern. Dividing the available frequency, however, limits the maximum data rate that can be provided to any single user or application by the system. Therefore, frequency reuse partitioning schemes are not suitable for supporting high data rate applications such as those envisioned for wireless broadband systems.

A specific implementation of frequency reuse partitioning is disclosed in U.S. Pat. No. 5,038,399 (the "Bruckert patent"). The Bruckert system is directed towards a mechanism for measuring various signal strengths from base stations and subscriber stations throughout the system, constructing a reuse level gradient, and using this gradient as a basis for switching between multiple frequency reuse patterns.

As with the Halpern system, the Bruckert system is unsatisfactory for a. number of reasons. For example, the Bruckert patent is also targeted towards a circuit switched system and is not designed towards modem packet switched systems. As a result, the bandwidth available to a user is fixed during the call duration, thus becoming inflexible for handling data bursts as anticipated in broadband services. Furthermore, the Bruckert patent describes a method for assigning different users to different reuse levels according to the "reuse level gradient," which is another way of stating the assignment is based upon different interference levels. In many instances, however, an integrated system providing different services to the same user may require different reuse levels due to their differing service requirements, even though they experience the same interference. The Bruckert patent fails to disclose how the quality of service (QoS) is maintained for each application using this method. In addition, the Bruckert patent fails to disclose any techniques for ensuring fairness among communication sites in terms of each site gaining access to the communication resource in a uniform manner. Finally, the Bruckert patent fails to disclose the use of multiple reuse patterns in the time domain, as with the previously discussed systems.

In view of the foregoing, it can be appreciated that a substantial need exists for a dynamic resource allocation method and apparatus for broadband services in a wireless communications system that efficiently provides high quality broadband packet services to a large number of users, and solving the other problems discussed above.

SUMMARY OF THE INVENTION

The disadvantages of the art are alleviated to a great extent by a dynamic resource allocation method and apparatus for broadband services in a wireless communications system. The communications system can have a number of cells, each of which has multiple sectors. Each sector can contain a number of communications sites. Information is transmitted in time subframes scheduled to avoid interference between the sectors and cells, and different degrees of concurrent packet transmission can be scheduled for different classes of communications sites. The communications sites can be classified based on reception quality, such as by comparing their measured signal-to-interference ratio (SIR) with a SIR threshold.

With these and other advantages and features of the invention that will become hereinafter apparent, the nature of the invention may be more clearly understood by reference the following detailed description of the invention, the appended claims and to the several drawings attached herein.

DETAILED DESCRIPTION

The present invention is directed to a dynamic resource allocation method and apparatus for broadband services in a wireless communications system. In particular, a resource allocation algorithm, referred to herein as the Enhanced Staggered Resource Allocation (ESRA) method,is used for broadband wireless networks with directional antennas at base stations and terminals. The ESRA method uses Staggered Resource Allocation (SRA) but also considers reception quality at terminal locations. This is done by categorizing terminals into multiple classes depending on the ability to tolerate concurrent packet transmissions. The bandwidth is divided into multiple time subframes, each of which has a number of mini-frames which allow different degrees of concurrent transmissions. The packets of different classes are sent in the corresponding mini-frames. In accordance with the ESRA method, concurrent transmissions are maximized up to an extent tolerable by the receiving terminals for throughput improvement, while avoiding major co-channel interference in the networks where the same frequency band can be re-used in every sector of every cell. In a reasonable radio environment, with practical antenna patterns and choices of system parameters, the ESRA method could provide 98.69% coverage, and yield a maximum throughput of 36.10% per sector, with a packet transmission success probability of one given a specific SIR threshold. This translates into a very large network capacity and the high quality of service reveals the applicability of the ESRA method to support real-time traffic, such as voice and video, in addition to data.

Although the system described in detail herein is a fixed broadband packet-switched network using TDMA techniques with user data rates of 10 Mb/s, link lengths typically less than 10 kilometers and an operating frequency in the range of 1 to 5 Ghz, the ESRA method can of course be used in other wireless communications systems.

Figure 2:
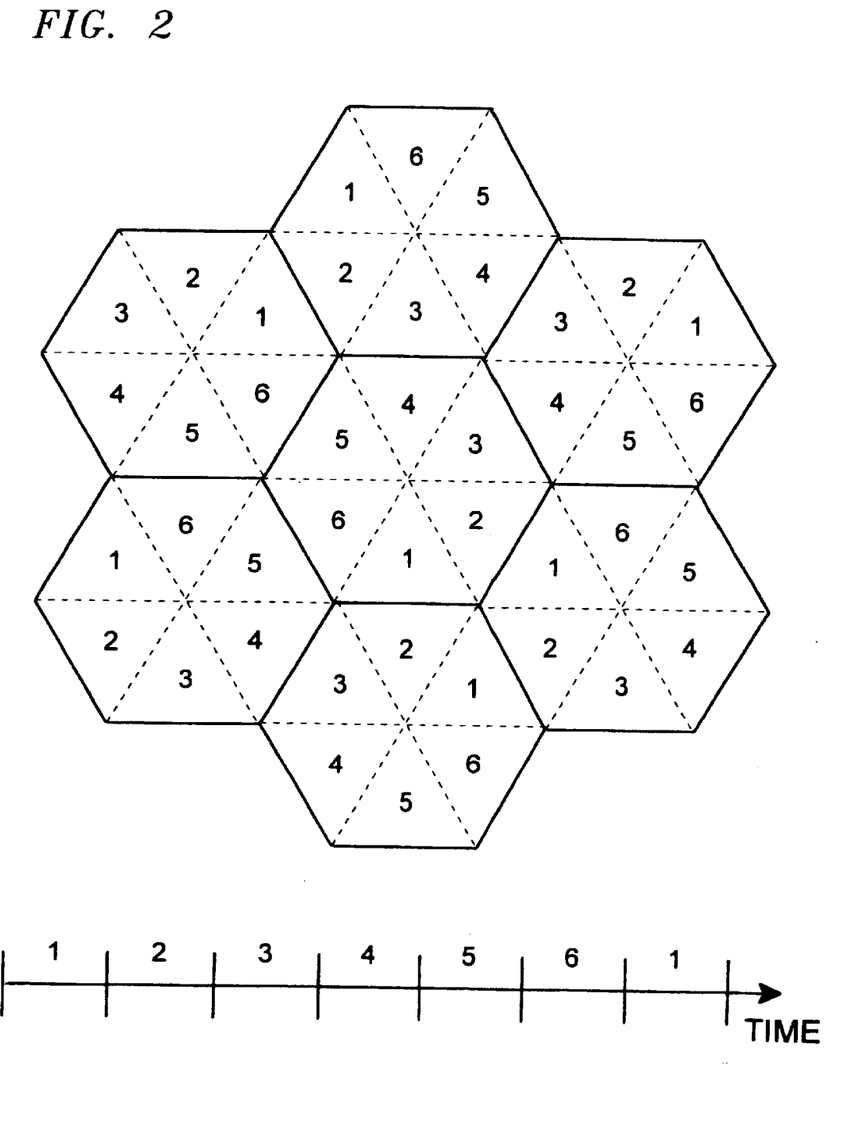
FIG. 2 shows a cell layout and frame structure according to an embodiment of the present invention.

Referring now in detail to the drawings wherein like parts are designated by like reference numerals throughout, FIG. 2 shows a service area in a wireless network divided into hexagon shaped cells. Each cell is further divided into multiple sectors numbered 1 to 6, and each sector is covered by a sector antenna co-located with a Base Station (BS), not shown in FIG. 2, at the center of the cell. Because of the co-location, sector antennas are also called BS antennas. Terminals (users) can use directional antennas mounted on rooftops and pointed to respective BS antennas. The beamwidth of each BS antenna can be just wide enough to serve the whole sector, while a terminal antenna can have a smaller beamwidth to suppress interference. The Front-to-Back (FTB) ratio for BS and terminal antennas are assumed to be finite. Time is slotted such that a packet can be transmitted in each slot, and the downlink and uplink between terminals and BS are provided by Time-Division Duplex (TDD) using the same radio spectrum.

In the context of packet-switched networks, time slots naturally become the bandwidth resources. Time slots need to be dynamically allocated to various transmitters to send data packets such that a given SIR can be achieved at the intended receiver for successful reception. This results in the concept of Dynamic Resource Allocation (DRA). The problem of time-slot assignment to achieve certain optimal performance while meeting a SIR requirement can be mathematically considered Non-Polynomial (NP) complete or hard, which implies a very high degree of computational complexity in deriving the optimal assignments.

In the fixed wireless network of the present invention, cell sectorization and directional antennas at fixed terminal locations are used to reduce interference from neighboring sectors and cells through the Staggered Resource Allocation (SRA) method. This results in a distributed DRA algorithm where the same radio spectrum is used (shared) by each sector in every cell on a dynamic time basis. With the use of directional antennas to suppress interference, the SRA method is particularly effective in avoiding both inter-cell and intra-cell interference.

However, depending on terrain and fading, a certain terminal (e.g., house) may be constantly unable to receive a signal with a satisfactory SIR due to its fixed location. The transmission for other terminals may always be successful. Thus, terminals at "good" and "poor" locations should be served according to different time-slot reuse patterns, which is called Time Slot Reuse Partitioning (TSRP), allowing for many BS's to transmit simultaneously if the intended receiving terminals are located at good positions. When the receiving locations are poor, few BS's should be scheduled to transmit at the same time so that a target SIR threshold can be met for successful reception at the receiving ends.

TSRP divides the time frame (i.e., bandwidth) into a dedicated portion and a shared portion. At most one packet is transmitted among four neighboring cells during each time slot in the dedicated portion and up to three packets can be transmitted simultaneously in every cell in the shared portion. The purpose is to allow terminals at "good" and "poor" locations to use time slots in the dedicated and shared portion, respectively. Because of the bandwidth partitioning into the dedicated and shared portion, many terminal locations with moderate reception quality either may be over-protected when transmitting in the dedicated portion or may not receive the packets successfully when sent during the shared portion. This results in a potential waste of bandwidth.

The present invention enhances the SRA method by considering the reception quality of terminals. This Enhanced Staggered Resource Allocation (ESRA) method has the capability of avoiding major interference as the SRA method does, and makes use of the knowledge of the reception quality at terminals to improve throughput and maintain the success probability of one for packet transmission. As discussed in detail below, ESRA also yields close to full coverage for a set of typical radio and system parameters.

Refer again to FIG. 2 with the regular, hexagonal cell layout. Each cell is divided into six sectors, each of which is served by a BS antenna with 60 degree beamwidth, and terminal antennas can have a beamwidth smaller than 60 degrees. In the SRA method, time slots are grouped into 6 subframes and sectors are labeled by 1 to 6 anti-clock-wise, as shown in FIG. 2. The sector labeling patterns for adjacent cells are rotated 120 degrees, creating a cluster of 3 cells whose patterns can be repeated across the entire system.

Note that the time frame shown in FIG. 2 is applicable to both the downlink and uplink, which are provided by TDD using the same spectrum.

Figure 3:
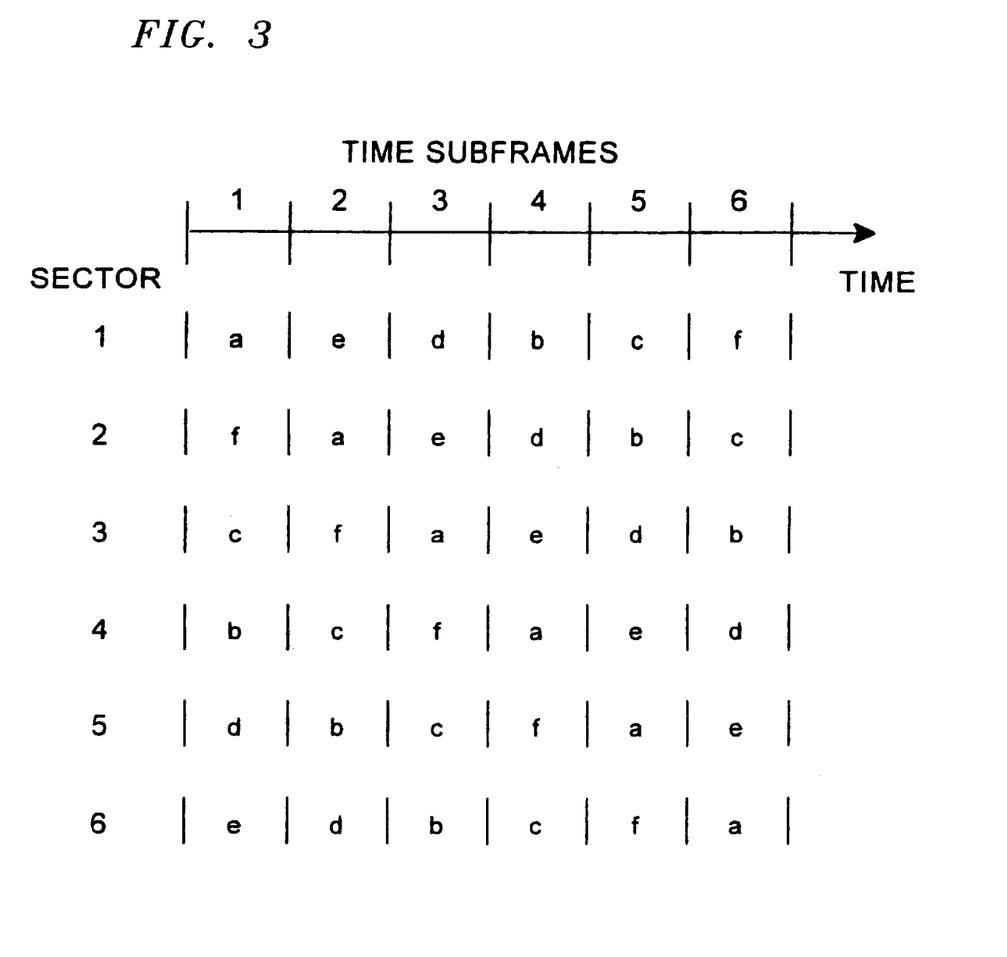
FIG. 3 shows the order of slot assignments for the staggered resource allocation method according to an embodiment of the present invention.

Each sector assigns time slots for transmitting packets to or from its terminals according to a special order shown in FIG. 3. It is assumed that the BS is informed when a terminal needs to send packets, perhaps via a separate multi-access channel or piggyback requests. For example, Sector 1 first schedules packets for transmission in time slots of subframe 1 (denoted by a). If it has more traffic to send, it then uses subframe 4 (b), subframe 5 (c), etc. until subframe 6 (f). The reasoning behind the particular order is as follows. If interference due to concurrent packet transmission in the same cell can be tolerated, then after using all slots in the first subframe a, Sector 1 should use the first subframe of the opposite sector (Sector 4) in the same cell to make the best use of the BS directional antennas. Following that, time slots in the first subframes for the sectors next to the opposite sector are used. To avoid interference due to overlapping antenna patterns of neighboring sectors, their first subframes are used as the last resort. For simplicity (while causing very minor throughput degradation), FIG. 3 does not show the assignment from the left and right-hand side of the subframes. The assignment order for the next sector is "staggered" by a right rotation by one subframe based on the order for the previous sector. The assignment order, regardless of the associated sector, is generally referred to as the "staggered" order.

It is easy to see from FIG. 3 that if all sectors have traffic load of less than one-sixth of total channel capacity, all packets are transmitted in different time subframes (labeled "a" in each sector), thus causing no interference within the same cell. Of course, as the traffic load increases packets will be transmitted simultaneously, and this increases the level of interference. Nevertheless, the staggered order exploits the characteristics of directional antennas to allow multiple concurrent packet transmissions while reducing the intra-cell interference.

Besides managing intra-cell interference, the SRA method helps avoid interference from major sources in the neighboring cells. This is particularly so when the traffic load is low to moderate. Consider the downlink for Sector 1 in the middle cell of FIG. 2. Sector 2 in the bottom cell and Sector 3 in the upper cell are the major sources of interference. By examining the staggered order for Sector 1, 2 and 3, note that they will not transmit simultaneously, and thus will not interfere with each other, provided each has a traffic load of less than one-third of total channel capacity (i.e., using only subframes a and b for transmission). The same comment also applies to the uplink, where Sector 2 and 5 of the bottom cell in FIG. 2 now become the major sources of interference. Due to the symmetry of the staggered order and cell layout, the comment applies to each sector in every cell.

For a given radio environment and antenna characteristics, the SRA method can be used in conjunction with a control mechanism to improve the SIR at the receiving e ends. Specifically, the control limits packet transmissions only in the first few subframes in the staggered order for each sector. For example, if at most three packets can be sent simultaneously by various BS or terminal antennas in the same cell to ensure the required reception quality in the given environment, only time slots in subframes a, b and c as indicated in FIG. 3 would be used for transmission in each sector. The control limits the degree of concurrent transmissions, and thus the amount of interference, to achieve a target SIR for the desirable quality of service.

The ESRA method can include the following components, discussed in detail below: terminal classification; selection of cell and sector; mini-frame structure and scheduling mechanism; and the selection of mini-frame sizes.

Terminal Classification

The ESRA method uses the same sector labeling as the SRA method shown in FIGS. 2 and 3. The basic idea of terminal classification in the ESRA method is to categorize terminals based on their ability to tolerate various degrees of concurrent packet transmissions according to the staggered order. The tolerance depends on the reception quality of the terminal locations, which in turn depends on the distance between the BS's and terminals, transmission power, antenna characteristics, terrain and fading. For the layout in FIG. 2 with six sectors per cell, there are six levels of concurrent transmission. Correspondingly, terminals are categorized into six classes, indexed by 1 to 6.

As depicted in FIG. 3, each time frame has 6 subframes, indexed by 1 to 6. Let $J_m^i$ be the index of the $m^{th}$ subframe for use by sector i in the staggered order. For example, $J_1^3=3$, $J_2^3=6$, $J_3^3=1$, $J_4^3=5$, $J_5^3=4$ and $J_6^3=2$ for sector 3 as it first uses slots in subframe 3, 6, 1, and so on, as shown in FIG. 2. Further, for c=1, 2, . . . , 6, let $I_c(j) \subseteq \{1, 2, \ldots, 6\}$ denote the set of sectors allowed to transmit in subframe j when each sector can use only the first c subframes in the staggered order for transmission (which results into c concurrent packet transmissions in each cell). For instance, $I_2(1)=\{1,4\}$, $I_3(1)=\{1,4,3\}$, $I_4(3)=\{3,6,5,1\}$ and $I_5(3)=\{3,6,5,1,2\}$.

Figure 4:
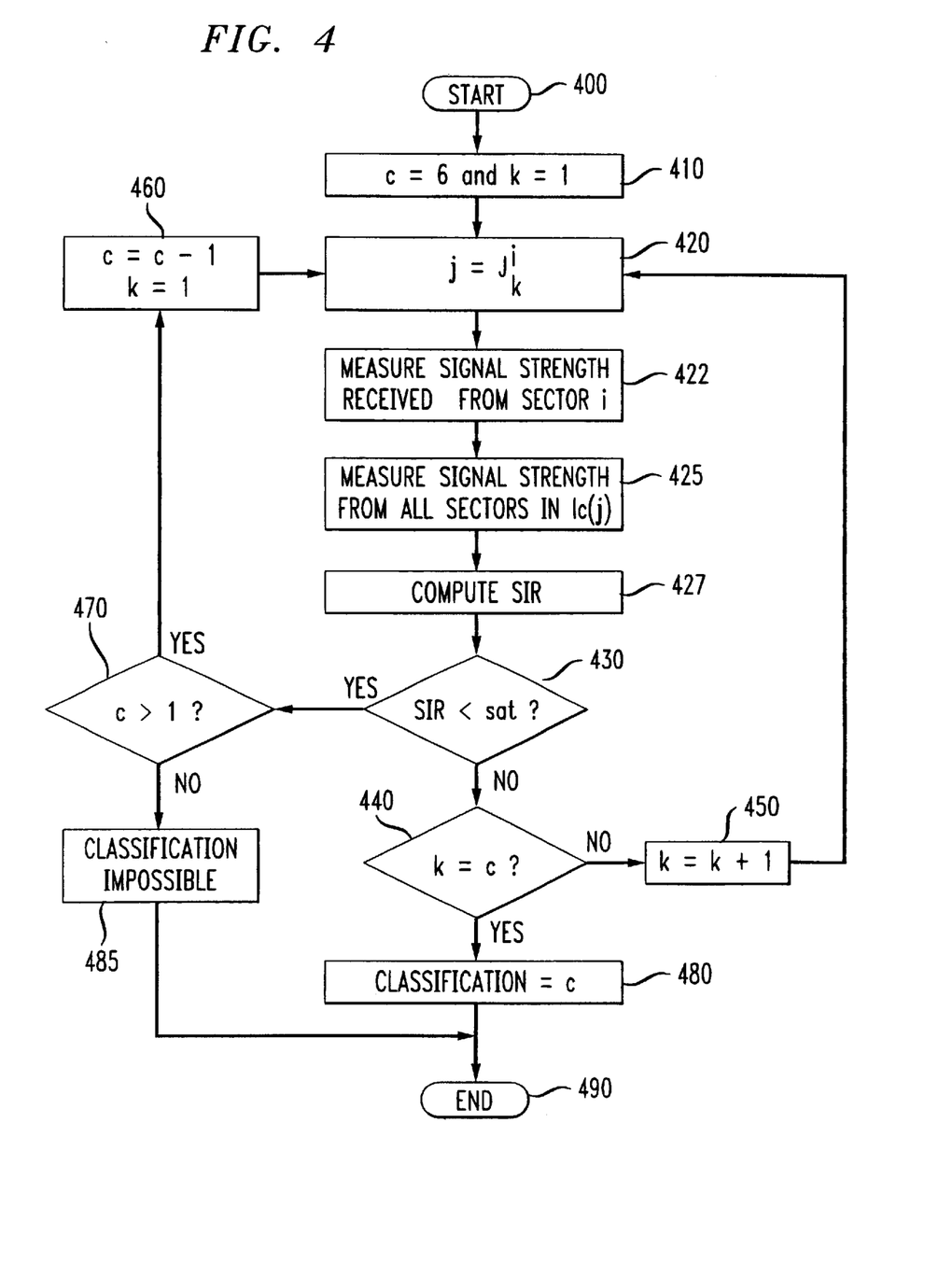
FIG. 4 is a block diagram of a terminal classification process according to an embodiment of the present invention.

Assume that the system can activate one or a set of BS antennas to send a special signal, such as via a pilot tone, for measurement purposes. FIG. 4 illustrates a classification procedure for a terminal located in sector i according to an embodiment of the invention. After beginning at step 400, the process sets c=6 and k=1 at step 410. The process then sets $j=J_k^i$ at step 720. The system instructs the BS antenna in the sector i, where the terminal belongs, to transmit a special signal. At step 422, the received signal strength is measured at the terminal location. Next, BS antennas for all sectors in $I_c(j)$ are arranged to transmit simultaneously and the received power at the terminal is measured at step 425. The SIR at the terminal when all sectors in $I_c(j)$ transmit can be obtained from these two measurements at step 427. At step 430, if the SIR is less than the threshold required for satisfactory signal detection, the process continues with step 470. Otherwise, the process continues with step 440.

At steps 440 and 480, the terminal is categorized as a class-c terminal and the procedure is completed if k=c. In other words, the system can sustain the interference with c concurrent packet transmissions according to the staggered order. Otherwise, at step 450 k is incremented by 1 and the process proceeds with step 420 to check the SIR when transmitting in the next subframe.

If at step 470 c>1, c is decreased by 1 and k is set to 1 at step 460 before step 420 is repeated. Otherwise, at step 485 the terminal cannot be served by the ESRA method because the terminal is unable to meet the SIR threshold—even when one packet is transmitted in each cell at a time. Therefore, the procedure stops at step 490.

For a typical radio environment, less than 1.5% of uniformly located terminals cannot be served by the ESRA method. In those cases, terminal antennas with improved FTB ratio, or sophisticated digital signal processing techniques to lower the SIR requirement, may be used to ensure satisfactory reception.

In practice, the terminal classification can be done when installing the service at a terminal location. In addition, the classification of each terminal could be updated periodically by monitoring the reception quality through measurements and statistics collection. Periodic monitoring would be helpful because the radio environment tends to change over time due to, for example, seasonal fluctuations and the addition of man-made objects to the radio path.

Selection of Cell and Sector

It is well known that cell selection can improve the quality of signal reception. To take advantage of the macro-diversity in the ESRA method, each terminal selects its cell and sector, which may not necessarily be the closest one in distance, according to the fading and the scheduling algorithm in use. Specifically, for each terminal, the ESRA method applies the terminal classification procedure presented above to determine a terminal class for several combinations of sectors and cells in the vicinity of the terminal. The terminal then chooses a home sector and cell that gives the terminal class with the largest index (i.e., that can tolerate the highest degree of concurrent transmission). If multiple combinations of cells and sectors yield the same terminal class, the one with the highest SIR can be chosen.

With this terminal classification and selection of cell and sector, packets for a class-c terminal can be received successfully, as far as meeting the required SIR is concerned, if each sector uses the first c subframes in the staggered order (which yields c concurrent packet transmissions in each cell). For this reason, the frame structure in FIG. 2 can be modified so that packets for each terminal class can now be transmitted simultaneously up to the maximum tolerable degree of concurrent transmissions in order to improve the throughput without degrading the success probability of packet reception.

Frame Structure and Scheduling Mechanism

Figure 5:
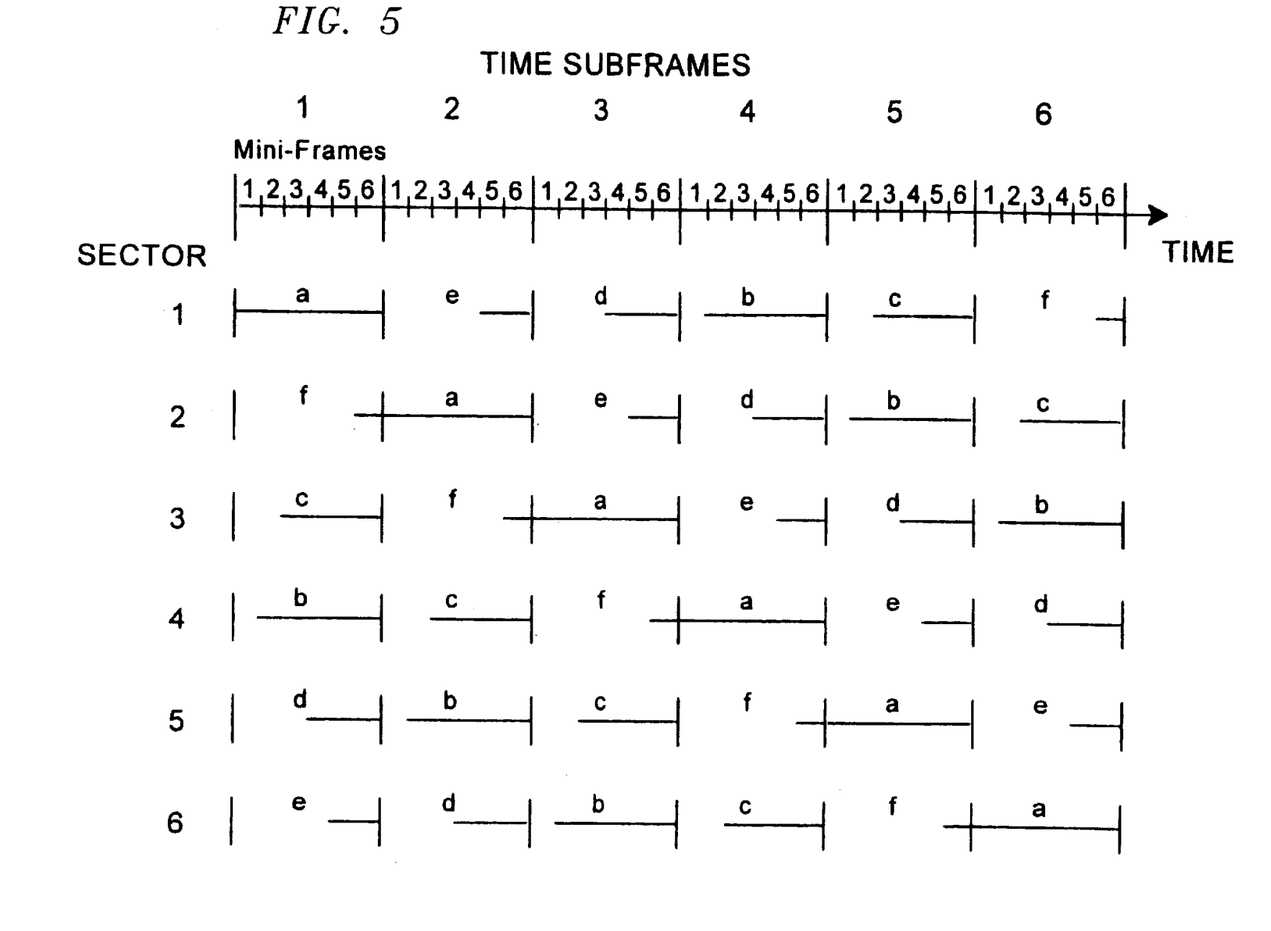
FIG. 5 shows the use order of subframes and mini-frames in the enhanced staggered resource allocation method according to an embodiment of the present invention.

Each time frame in the ESRA method consists of six subframes, indexed by 1 to 6 in FIG. 5. Each subframe is further divided into six "mini-frames," which are also labeled from 1 to 6. Each mini-frame with the same label consists of multiple but fixed number of time slots in each subframe. The sizes of mini-frames are chosen to match the expected traffic demand of the terminal classes and each sector uses the subframes according to the staggered order, given by "a" to "f" in FIG. 5. It is important to note that time slots of only those mini-frames marked with a solid line are available to the corresponding sector indicated on the leftmost side of the figure. Clearly, varying from subframe to subframe, each sector is allowed to schedule packet transmission in one or more mini-frames in some subframes, but not in others. For instance, Sector 2 can use all mini-frames in Subframe 2, but it can schedule transmission only in Mini-frame 5 and 6 in Subframe 3. The other mini-frames in Subframe 3 are unavailable to Sector 2.

There are different degrees of concurrent packet transmission in various mini-frames. For c=1, 2, . . . , 6, as many as c packets are transmitted simultaneously during mini-frame c in each subframe. On one extreme, only one packet is transmitted in each cell during Mini-frame 1, while on the other extreme, up to six packets are sent during Mini-frame 6. The various mini-frames allow different degrees of concurrent packet transmissions. Thus, the mini-frame structure is compatible to the terminal classification because packets for class-c terminals transmitted in mini-frame c will be successfully received as verified in the classification procedure. In fact, as discussed in detail below, packet transmission for a class-k terminal in mini-frame c with c<k, referred to as "upgraded sharing," will also be successfully received.

Figure 6:
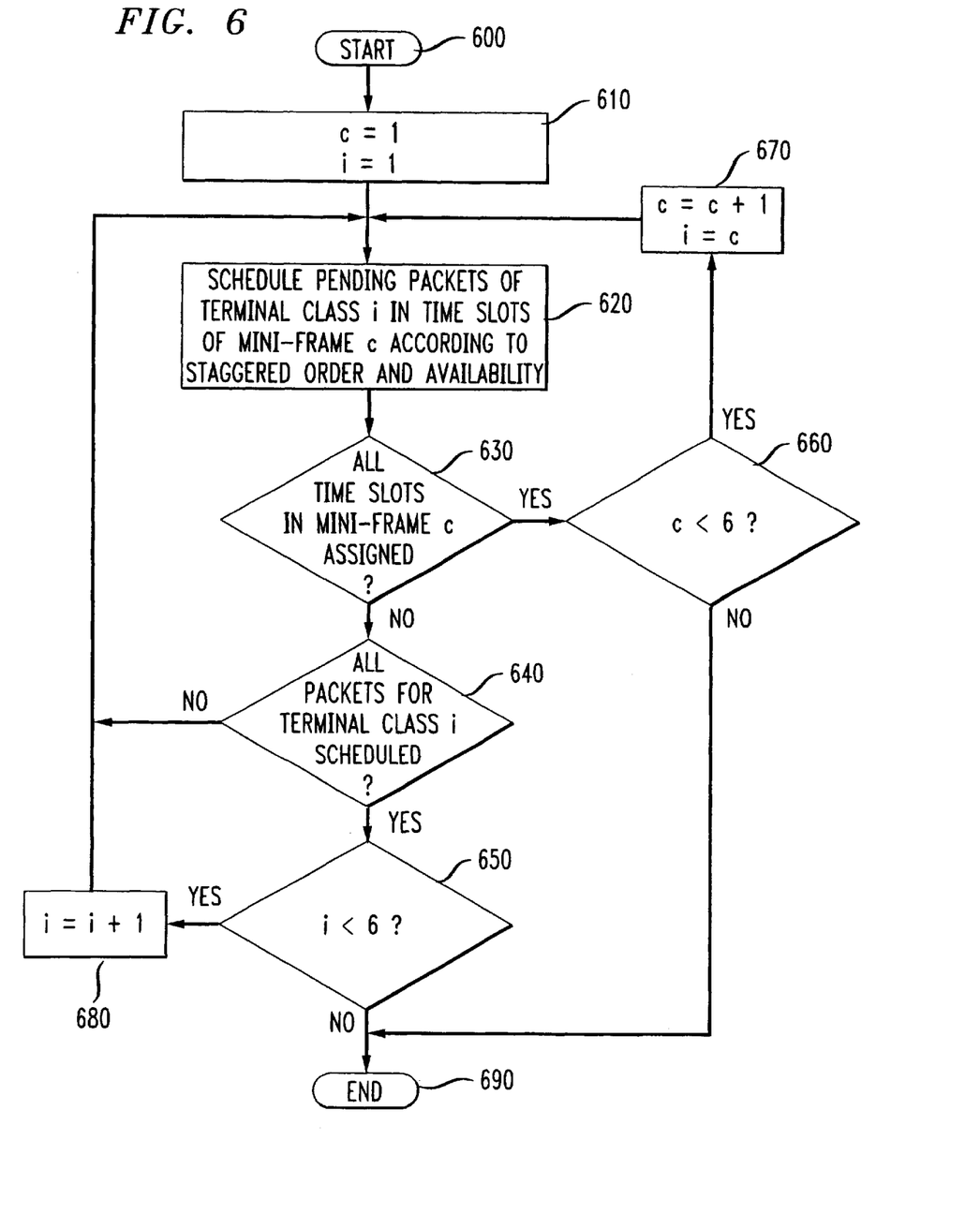
FIG. 6 is a block diagram of a time slot scheduling process according to an embodiment of the present invention.

In the ESRA method, the procedure shown in FIG. 6 is invoked for each time frame by each sector in every cell to assign available time slots in the frame to pending packets for transmission. Once a packet is scheduled for transmission in a time slot, the slot becomes unavailable to other packets.

After beginning at step 600, the procedure sets c=1 and i=c at step 610. At step 620, the sector schedules pending packets of terminal class i for transmission in the available time slots of mini-frame c, starting from the first subframe in the staggered order (denoted by a to f) and according to the availability of mini-frames in the subframes to the sector as shown in FIG. 5. The scheduling continues until either (i) all available time slots in mini-frame c have been assigned at step 630; or (ii) all pending packets for the terminal class have been scheduled for transmission at step 640. If condition (i) occurs, the process proceeds with step 660, otherwise the process proceeds with step 650.

At step 660, if c<6, then c is increased by 1 and i is set to c at step 670 before proceeding with step 620. Otherwise, the procedure stops at 690 as all available time slots in the time frame have been assigned.

At step 650, if i<6, then i is increased by 1 and the process proceeds with step 620 to schedule transmission of packets for the next terminal class in mini-frame c. Otherwise, the procedure stops at step 690 as all pending packets have been scheduled for transmission. It is worth noting that as long as time slots are available, packets are transmitted by the upgrade sharing to further enhance the SIR at the receiving ends.

Selection of Mini-Frame Sizes

The mini-frame structure can be viewed as a division of bandwidth into multiple "channels" allowing different degrees of concurrent packet transmissions tolerable in terms of SIR by various terminals. To maximize the system throughput the sizes of mini-frames should be chosen to match the traffic load from the respective terminal classes. Without loss of generality, consider that terminals of all classes have an identical traffic load. Let $\alpha_i$ be the fraction of class-i terminals (relative to the total number of terminals served by the ESRA method) in the whole network for i=1 to 6. Further, let $N_t$ be the "target" number of time slots in each subframe frame, which is determined by considering packet delay requirements, scheduling overhead and so on. In addition, let mini-frame i in each subframe have $n_i$ time slots. As explained in detail with respect to FIG. 5, each sector can use mini-frame i in i different subframes. Therefore, to handle the uniform traffic load among terminals:

$$n_i = \beta \frac{\alpha_i}{i}$$

where $\beta$ is a proportionality constant and the rounding of integer is ignored at the present moment. Since:

$$\sum_i n_i = N_t$$

the following relationship holds:

$$\beta = \frac{N_t}{\sum_j \alpha_j / j}$$

Substituting this into the equation above for $n_i$ yields:

$$n_i = \left[ \frac{N_t \alpha_i / i}{\sum_j \alpha_j / j} \right]$$

where [x] denotes the integer closest to x. With these mini-frame sizes, each subframe has:

$$N = \sum_i n_i$$

time slots. The frame size is KN where K is the number of sectors in each cell, which equals 6 for the setting under consideration.

Performance Analysis of the ESRA Method

Using the terminal classification method described herein, packet transmissions for each terminal class in its respective mini-frame will be successful. That is, the success probability of packet transmission is one as far as meeting a specific SIR threshold is concerned.

To analyze the packet throughput for the ESRA method, assume that terminals of all classes have identical traffic load and that there are always packets pending for transmission. Based on the size of each mini-frame i, the maximum throughput for class-i terminals is in/KN packets per time slot in each sector. This is because: (1) each sector can transmit during mini-frame i in i different subframes of each frame, and (2) each packet transmission for class-i terminals in mini-frame i will be successful by the definition of terminal classification. Thus, the maximum throughput in each sector for all terminal classes is:

$$\gamma_m = \sum_i \frac{in_i}{KN} = \sum_i \frac{i}{KN} \left[ \frac{N_t \alpha_i / i}{\sum_j \alpha_j / j} \right].$$

Ignoring the rounding for integer, and applying the facts that $$\sum_i \alpha_i = 1$$

and $N_t \approx N$, the maximum throughput per sector is obtained:

$$\gamma_m \approx \frac{1}{K \sum_j \alpha_j / j}$$

Since the success probability of packet transmission for the ESRA method is one, its throughput is only limited by the availability of pending packets associated with each terminal class for a given mini-frame structure. As a desirable consequence, once the maximum throughput is reached for sufficient traffic, further increase of traffic load will not cause any throughput degradation.

Although it may appear that the bandwidth partition into mini-frames in the ESRA method could lead to loss of "trunking efficiency," note that packets for class-k terminals can be transmitted successfully during any mini-frame c available to the associated sector with c≦k. When such a packet is sent in mini-frame c<k, the SIR can actually be improved at the receiving ends. Such sharing of mini-frames is referred to as "upgraded sharing."

To show the SIR improvement, let Φ be the SIR threshold for correct signal detection at a receiver. Further, use $P_j$ to denote the received signal or interference strength from the BS antenna of sector j. Without loss of generality, consider a terminal in a particular sector i. As before, use $J_m^i$ to denote the index of the $m^{th}$ subframe in the staggered order for use by the sector i in the time-slot assignment. According to the terminal classification, the terminal is categorized to be class k if k is the largest integer such that:

$$\frac{P_i}{\sum_{s \in I_k(j)} P_s} \geq \Phi$$

for all m=1, 2, ..., k and $j=J_m^i$. If a packet for the class-k terminal in sector i is transmmitted in mini-frame 1<k, then the SIR at the receiver is given by $$\phi = \frac{P_i}{\sum_{s \in I_k(j')} P_s}$$

where $j'=J_m^i$ for some m∈{1,2, ..., 1} because the sector can use mini-frame l in any one of the first l subframes in the staggered order. Since l<k, which indicates different degrees of concurrent packet transmission, $I_l(j) \subset I_k(j)$ for any subframe j. This is certainly true for all $j=J_m^i$ with m=1, 2, ..., l. Combining this and the fact that $P_s \geq 0$, the denominator in the equation for $\Phi$ must be less than or equal to that in the equation associated with $\phi$, thus $\phi \geq \Phi$. In other words, the upgraded sharing, or transmitting class-k packet in any mini-frame c with c<k, can meet the SIR detection threshold. Since it is possible that $P_s=0$, or transmission is at a lower power level, when a sector s does not have sufficient traffic to send, the upgraded sharing actually improves the SIR at the receivers.

In contrast, a similar analysis reveals that transmitting class-k packets during available time slots in mini-frame c>k, to be called "downgraded sharing," cannot guarantee the satisfactory SIR. That is, the downgraded sharing does not yield successful packet transmission with probability one. For this reason, the scheduling algorithm described with respect to FIG. 6 does not include such sharing. Nevertheless, the downgraded sharing can still be applied to packets without tight delay requirements. This is particularly so if the BS can schedule class-k packets for transmission in time slots of mini-frame c>k when the traffic load is sufficiently low that the degree of concurrent packet transmissions in those slots can be kept to be no more than k. It is important to note that packet transmissions by the downgraded sharing have no impacts on the original transmissions, or those by the upgraded sharing, because the downgraded sharing does not increase the degree of concurrent transmissions. Thus the interference level remains unchanged. In the worst case, if packets are not received successfully the first time by the downgraded sharing, they can be re-transmitted in their corresponding or upgraded mini-frames.

Numerical Performance Results for the ESRA Method

Typical radio and antenna parameters and a simulation model created with OPNET, a computer-aided engineering tool for communication networks and analysis developed by MIL 3, Inc. of Washington, D.C., were used to obtain the fraction of terminals of different classes. Based on the fractions and the assumption of uniform traffic among terminal classes, the results were then applied to compute the maximum packet throughput for the ESRA method.

Figure 7:
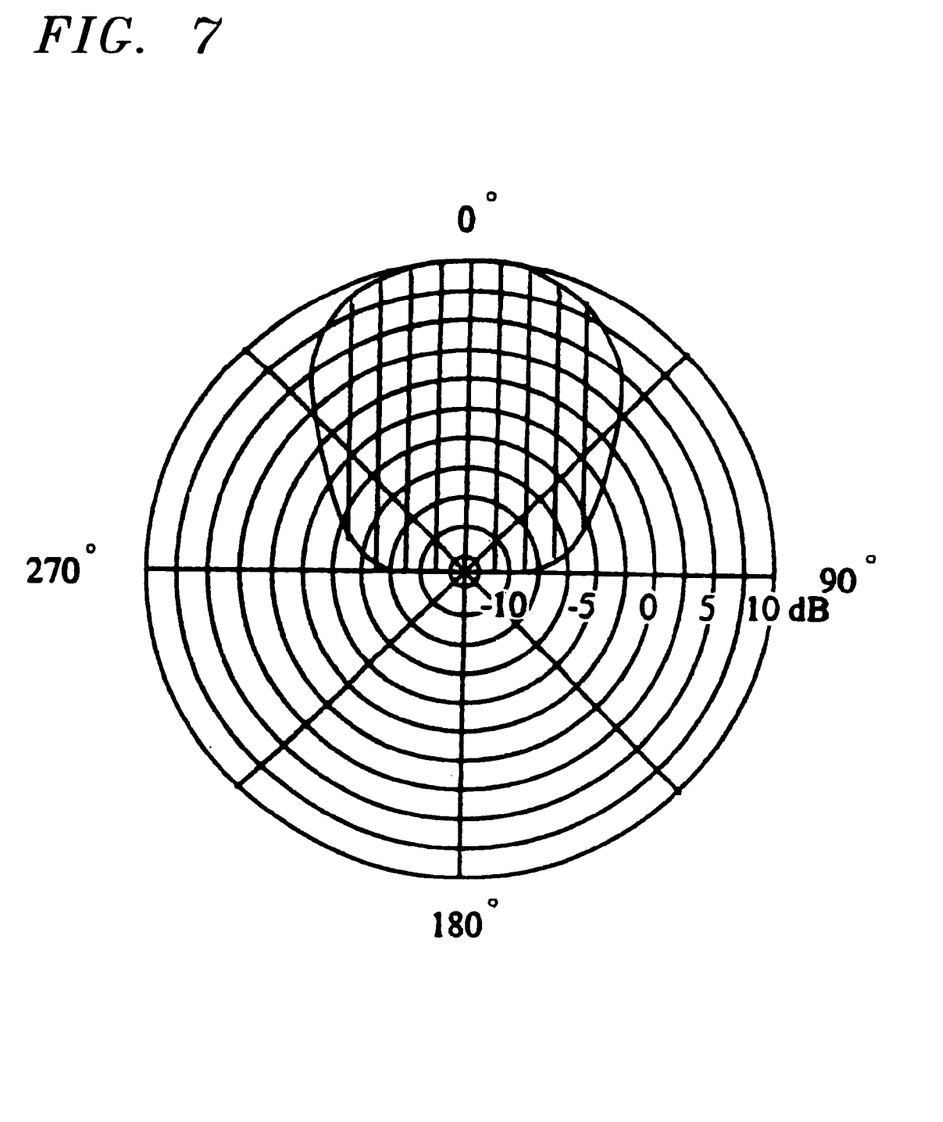
FIG. 7 shows a typical antenna pattern, with a front-to-back ratio of 25 dB and a beamwidth of 60 degrees, suitable for use with an embodiment of the present invention.

A two-tier, hexagonal-cell layout with a total of 19 cells was used. That is, an outer tier of 12 cells is added to the configuration shown in FIG. 2. Each cell was divided into 6 sectors, each of which is served by a BS antenna co-located at the center of the cell. Unless specified otherwise, the beamwidth (where the signal strength drops by 3 dB) of each BS and terminal antenna is 50 degrees and 30 degrees, respectively, while each terminal antenna points directly to its BS antenna. Practical antenna patterns, such as the one shown in FIG. 7, were used. Although the back/side lobe is not shown, signal arriving at the back/side lobe is attenuated according to the FTB ratio. Due to the overlapping of antenna patterns, it is likely that certain terminals, especially those located at the sector boundary, will receive a significant amount of interference from the neighboring sectors.

Each radio path between a transmitter and a receiver was characterized by a path-loss model with an exponent of 4 and lognormal shadow fading. For the downlink, since there is only one radio path between all BS antennas in the same cell (which are co-located) and any terminal in the cell, the intended signal and interference should experience the same lognormal fading and path loss. However, the fading from BS antennas at other cells were assumed to be different and independent. Unless stated otherwise, the typical FTB ratios for BS and terminal antennas (denoted by B and T) are 25 and 15 dB, respectively. The standard deviation for the shadow fading is 8 dB. Furthermore, with standard modulation and equalization schemes, such as Quadrature Phase-Shift Keying (QPSK) and Decision Feedback Equalization (DFE), the SIR threshold for satisfactory detection could be from 10 to 15 dB, so a SIR threshold of 15 dB was selected. For each packet transmission, if the SIR at the intended receiver exceeded the threshold the packet was considered to be successfully received. Only the statistics in the middle cell are collected and the following results were obtained for about 1,000 terminals uniformly placed throughout sector 1 of the center cell.

Following the classification method of FIG. 4, the following Table 1 presents the fraction of terminals in various classes for the SIR threshold of 15 dB.

TABLE 1

| Fraction of Terminals in Various Classes | | |
|---|---|---|
| Terminal Class | Without BS Selection | With BS Selection |
| 1 | 0.1146 | 0.0813 |
| 2 | 0.5250 | 0.6375 |
| 3 | 0.0333 | 0.0479 |
| 4 | 0.0115 | 0.0208 |
| 5 | 0.0219 | 0.0292 |
| 6 | 0.1531 | 0.1698 |
| Coverage | 0.8594 | 0.9864 |
| Throughput | 0.3402 | 0.3610 |

Results with or without BS and sector selection, referred to as "BS selection" in short, are included. The sum of the fractions for all classes gives the total fraction of terminals that can be served by the ESRA method, or "coverage." Since the ESRA method can eliminate intra-cell interference entirely by allowing only one packet transmission in each cell at a time, the coverage is determined mainly by inter-cell interference and fading. On the other hand, the maximum throughput strongly depends on the fractions of terminals in various classes. That is, a higher degree of tolerable concurrent transmissions results in higher throughput.

Without BS selection, the coverage is 85.94%, the remaining 14.06% of terminals cannot be served even when there is only one packet transmission in each cell at a time. In contrast, the coverage increases to 98.64% with BS selection due to macro-diversity, and such coverage is adequate in practice.

It is also worth noting that Table 1 reveals that a majority of the terminals are in class 2 and a smaller fraction are in classes 3 to 5. This is because the staggered order is particularly good at avoiding both intra- and inter-cell interference when each sector transmits in the first two subframes in the order. For higher degrees of concurrent transmissions, however, the amount of intra-cell interference increases due to the overlapping antenna patterns between adjacent sectors in the same cell. The 16.98% class-6 terminals are likely located near the BS with favorable fading and are not affected by adjacent sectors.

Figure 8:
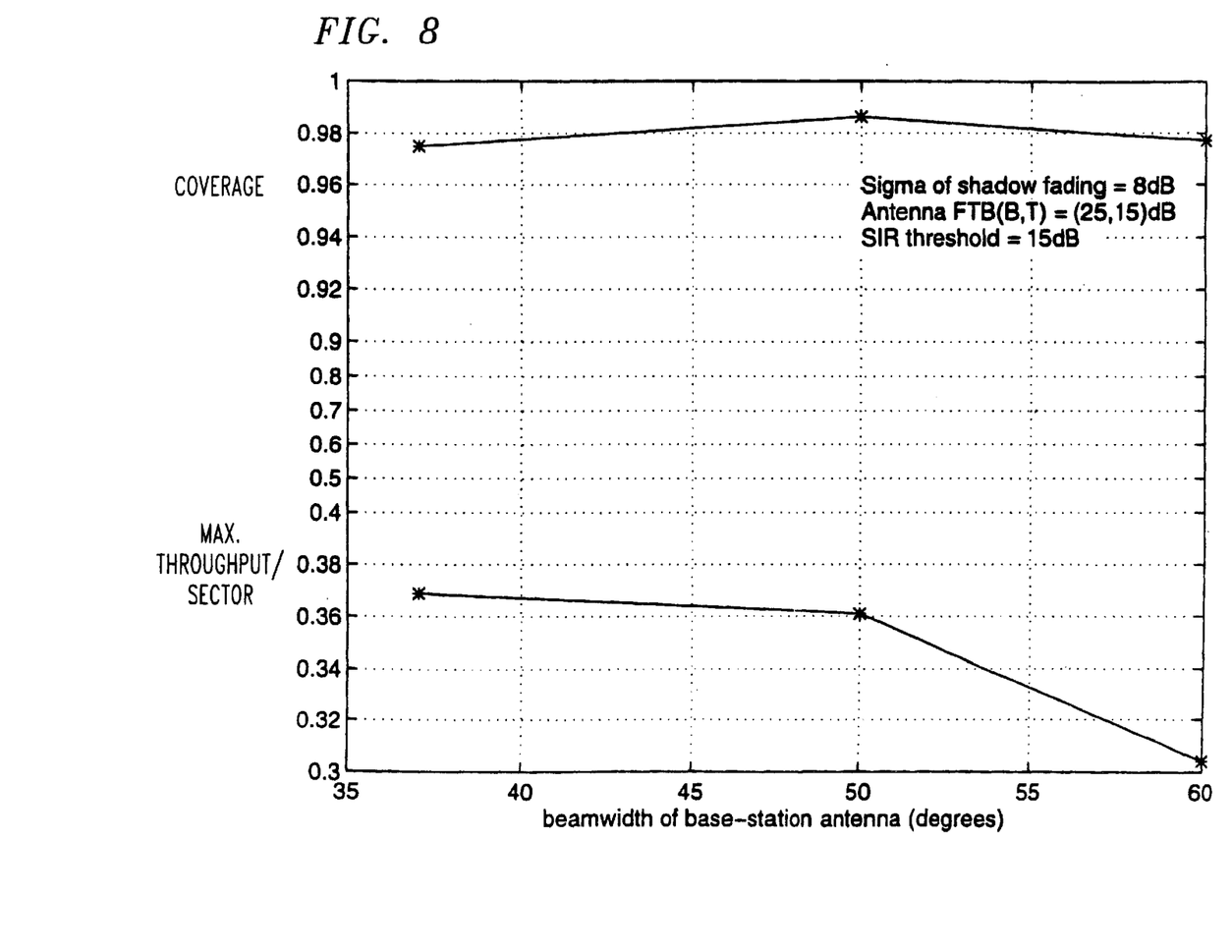
FIG. 8 shows the impact of the base station antenna beamwidth on throughput and coverage according to an embodiment of the present invention.
Figure 9:
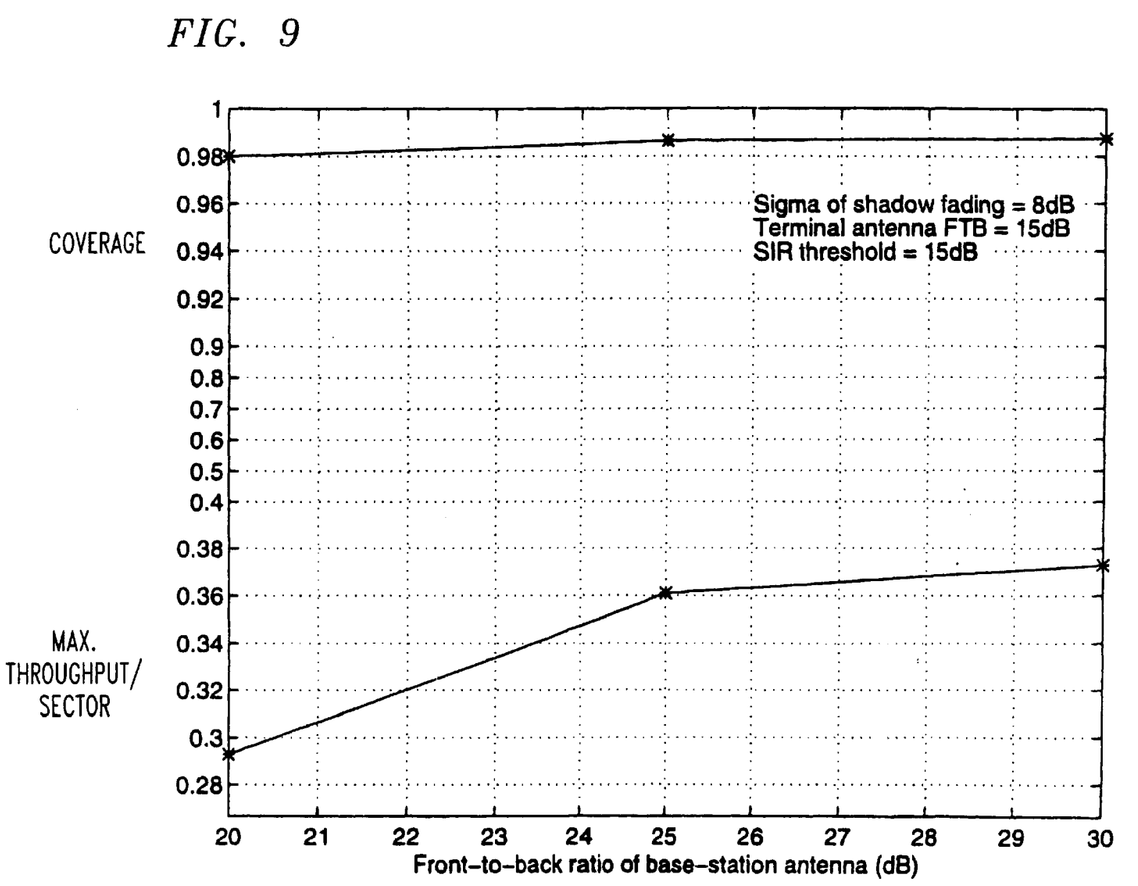
FIG. 9 shows the impact of the base station antenna front-to-back ratio on throughput and coverage according to an embodiment of the present invention.
Figure 10:
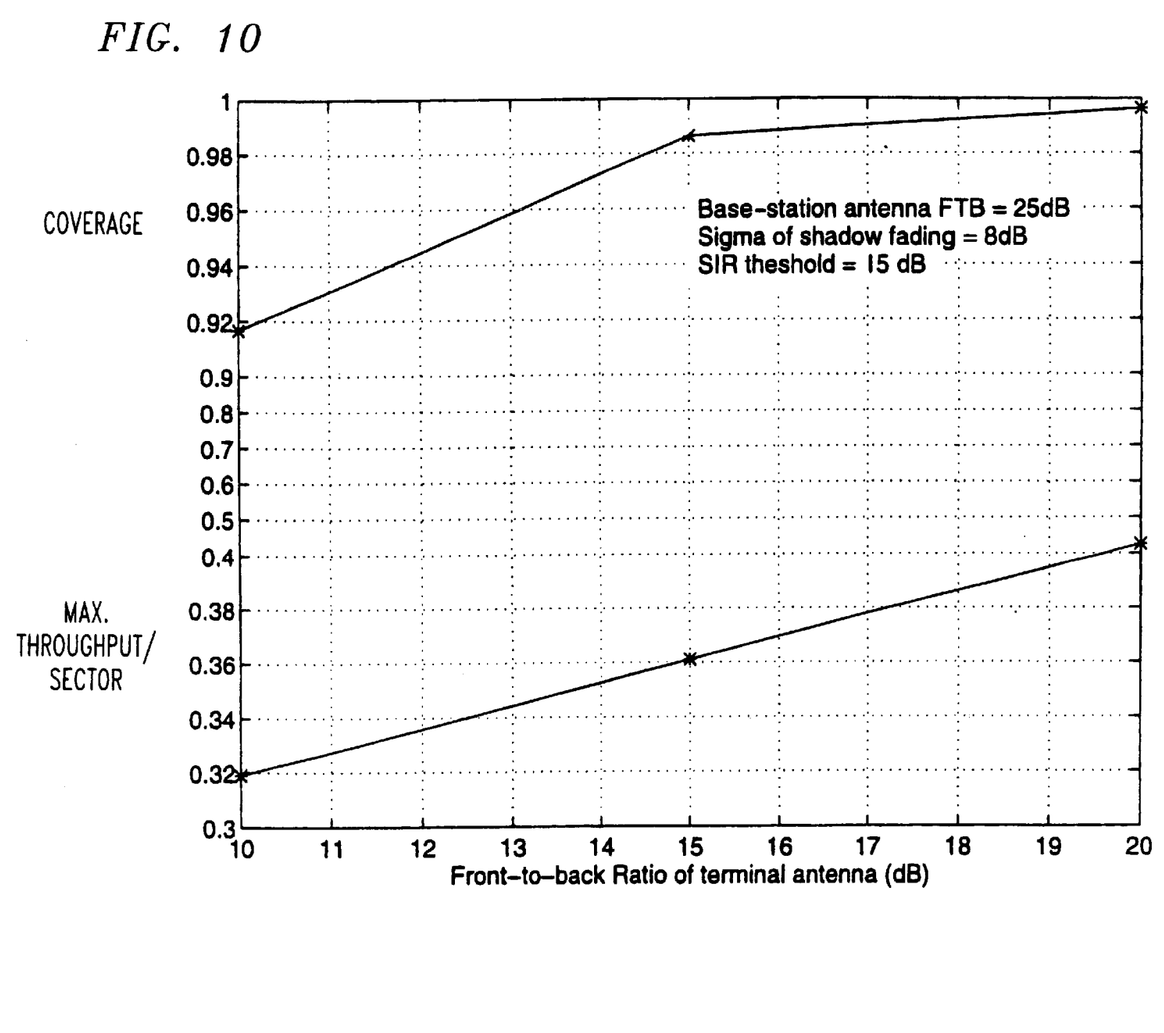
FIG. 10 shows the impact of the terminal antenna front-to-back ratio on throughput and coverage according to an embodiment of the present invention.

FIGS. 8 to 10 show how the antenna beamwidth and FTB ratios can impact the performance of the ESRA method. FIG. 8 shows the effect BS antenna beamwidth can have on the maximum throughput and coverage. The coverage is insensitive to the beamwidth, and the maximum throughput can be improved if the beamwidth is reduced from 60 degrees to a smaller value. This is because a narrower beamwidth reduces interference from neighboring cells and sectors. A beamwidth of about 50 degrees for BS antenna may be appropriate to serve a 60 degree sector.

The beamwidth of the terminal antenna was also varied from 10 to 40 degrees, while keeping the BS antenna beamwidth at 50 degrees and other system parameters unchanged. ESRA performance is also insensitive to the range of terminal antenna beamwidth because as long as the beamwidth is less than 60 degrees each terminal antenna faces to the front lobe of the BS antenna of one sector in the first-tier neighboring cells, which contributes most of the inter-cell interference for the terminal.

As shown in FIG. 9, which illustrates the performance impacts due to the FTB ratio of BS antenna, the coverage is relatively insensitive to the FTB ratio of BS antenna. On the other hand, as the FTB ratio increases, interference decreases, allowing a high degree of concurrent transmissions and improving the maximum packet throughput. However, when the FTB ratio reaches 25 dB, further increases of the ratio yield only marginal throughput improvement because other parameters, such as the terminal antenna FTB ratio and SIR threshold, become dominating factors in determining the throughput.

In contrast, FIG. 10 shows that both coverage and throughput strongly depend on the FTB ratio for terminal antennas. Generally, when the ratio is high, inter-cell interference can be suppressed sufficiently so that almost all terminals meet the SIR threshold and terminals can tolerate a high degree of concurrent transmissions. As a result, both coverage and throughput improve as the terminal FTB ratio improves.

In summary, the ESRA use of mini-frames can apply various limits to control the degree of concurrent transmissions, depending on the reception quality at the terminal locations. Using ESRA terminal classification and scheduling, packet transmissions for all terminal classes can be successfully received given a specific SIR threshold. This is in contrast to the uncertainty of successful packet reception for the SRA method, the TSRP approach and most contention based multi-access protocols. Furthermore, ESRA performance is stable because its throughput and successful packet transmission do not deteriorate with an excessive amount of traffic. For these reasons, the ESRA method could be used even for real-time traffic such as voice and video services. In addition, the success probability of one for packet transmission can help simplify call admission control and traffic management to ensure a desired level of QoS.

ESRA performance depends on the correct categorization of terminals. As the quality of a radio path between any pair of BS and terminal can change over time, perhaps due to seasonal fluctuation or man-made objects, the reception quality can be periodically monitored and, when needed, a terminal can be re-classified. To handle temporary fluctuation, the ESRA method can use the upgraded sharing approach to re-transmit packets (i.e., to make sure that class-c packets are re-transmitted in mini-frame k with k<c) that are not received properly the first time.

For a reasonable radio environment, using practical antenna patterns and system parameters, the ESRA method provides 98.64% coverage, and yields a maximum throughput of 36.10% per sector with a success probability of one for packet transmission.

Although various embodiments are specifically illustrated and described herein, it will be appreciated that modifications and variations of the present invention are covered by the above teachings and within the purview of the appended claims without departing from the spirit and intended scope of the invention. For example, although a TDMA system was used to illustrate various embodiments of the invention, it can be appreciated that other systems fall within the scope of the invention. Similarly, although various embodiments of the invention make reference to fixed terminal stations, it can be appreciated that mobile terminal stations could fall within the scope of the invention. Another example includes the number of sectors and cells discussed in the various embodiments. It can be appreciated that different numbers of sectors or cells also fall within the scope of the invention.

What is claimed is:

1. A method for operating a communications system having a plurality of communications sites and a service area divided into a plurality of sectors, the communications system using a plurality of time subframes scheduled to avoid interference between the plurality of sectors, each subframe being further divided into a plurality of mini-frames, comprising the steps of:
scheduling a first degree of concurrent packet transmissions in a first mini-frame for a first class of communications sites located within each sector;
scheduling a second degree of concurrent packet transmissions in a second mini-frame for a second class of communications sites located within each sector, the second degree being different from the first degree; and
communicating said packets according to said scheduling.

2. The method of claim 1, further comprising the step of:
classifying the plurality of communications sites into a plurality of classes including the first class and the second class.

3. The method of claim 2, wherein said step of classifying classifies a communications site based on the reception quality of the communications site.

4. The method of claim 3, wherein said step of classifying classifies a communications site based on the signal to interference ratio of the communications site and at least one threshold signal to interference ratio.

5. The method of claim 4, wherein said step of classifying assigns a communications site to the classification having the highest degree of concurrent packet transmission possible and yet maintain a threshold success probability for the threshold signal to interference ratio.

6. The method of claim 5, wherein the threshold success probability is one.

7. The method of claim 2, wherein said step of classifying is performed at the beginning of the operation of the communications system.

8. The method of claim 2, wherein said step of classifying is performed periodically during the operation of the communications system.

9. The method of claim 2, wherein mini-frames in a subframe have different sizes.

10. The method of claim 9, wherein mini-frames are assigned a size selected based on the expected traffic from the associated class of communications sites.

11. The method of claim 9, wherein mini-frames are assigned a size selected based on the number of communications sites in the associated class.

12. The method of claim 1, wherein packet transmissions for one class of communications sites can be transmitted in an alternate mini-frame associated with another class of communications sites having a lower degree of concurrent transmission.

13. The method of claim 12, wherein packet transmissions for the one class of communications sites are transmitted in the alternate mini-frame whenever the alternate mini-frame is not being used to capacity.

14. The method of claim 2, further comprising the step of:
selecting an appropriate sector for a communications site based on the classification of the communications site in a plurality of different sectors.

15. The method of claim 1, wherein said scheduling steps create an excess information transmission schedule indicating when excess information for an initial subframe is to be transmitted in other subframes and mini-frames.

16. The method described in claim 15, wherein said other subframes are selected according to a special order.

17. The method described in claim 16, wherein said special order is created by ordering all subframes from a minimum level of interference to a maximum level of interference.

18. The method described in claim 17, wherein said special order is created using a staggered resource allocation protocol.

19. The method described in claim 18, wherein the service area has a plurality of cells, and each cell has six sectors.

20. The method described in claim 19, wherein the system has six subframes, with each sector within a cell being assigned a different subframe.

21. The method described in claim 20, wherein the pattern is created by rotating each cell 120 degrees.

22. The method described in claim 21, wherein said initial subframe for sector one is subframe one, and said special order comprises subframes four, five, three, two and six.

23. The method described in claim 22, wherein when said initial subframe is subframes two through six, said staggered resource allocation protocol staggers said special order by one subframe, respectively.

24. The method of claim 23, wherein said communications sites are divided into six classes, each of the six classes corresponding to one of the six subframes.

25. The method of claim 1, wherein the communication sites are fixed.

26. A communications system having a plurality of communications sites and a service area divided into a plurality of sectors, the communications system using a plurality of time subframes scheduled to avoid interference between the plurality of sectors, comprising:
a first class of communications units operably associated with the service area for communicating between the communications sites using at least one time subframe;
a second class of communications units operably associated with the service area for communicating between the communications sites using at least one time subframe;
a scheduler for scheduling a first degree of concurrent packet communications for the first class of communications sites and scheduling a second degree of concurrent packet communications for the second class of communications sites, the second degree being different from the first degree.

27. The system described in claim 26, wherein said scheduler creates an excess information transmission schedule.

28. The system described in claim 27, wherein said excess information transmission schedule indicates when excess information for an initial subframe is to be transmitted in other subframes.

29. The system described in claim 28, wherein said other subframes are selected according to a special order.

30. The system described in claim 29, wherein said special order is created by ordering all subframes from a minimum level of interference to a maximum level of interference.

31. The system described in claim 30, wherein said special order is created using a staggered resource allocation protocol.

32. The system described in claim 31, wherein the service area has a plurality of cells, and each cell has six sectors.

33. The system described in claim 32, wherein the system has six subframes, with each sector within a cell using a different subframe.

34. The system described in claim 33, wherein the pattern is created by rotating each cell 120 degrees.

35. The system described in claim 34, wherein said initial subframe for sector one is subframe one, and said special order comprises subframes four, five, three, two and six.

36. The system described in claim 35, wherein when said initial subframe is subframes two through six and the staggered resource allocation protocol staggers said special order by one subframe.

* * * * *